Oct. 12, 1965  C. F. ROBINSON  3,212,086
RADAR DISPLAY APPARATUS
Filed Feb. 20, 1963  4 Sheets-Sheet 1
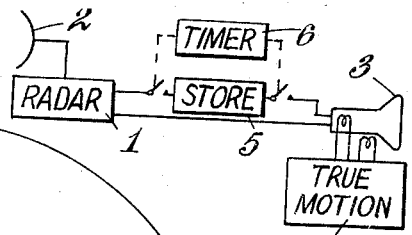
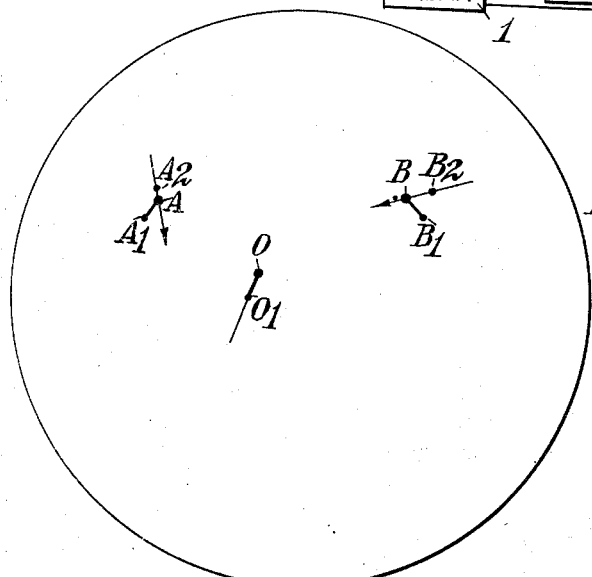
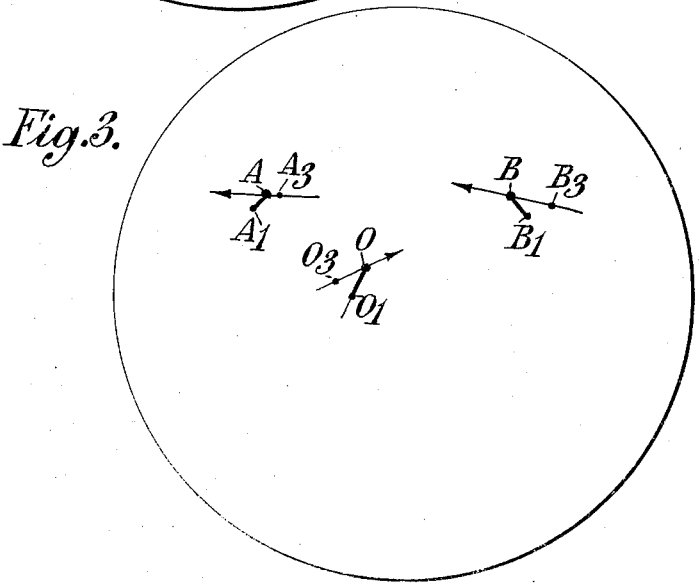

3,212,086
RADAR DISPLAY APPARATUS
Charles Freeman Robinson, London, England, assignor to Decca Limited, London, England, a British company
Filed Feb. 20, 1963, Ser. No. 259,850
Claims priority, application Great Britain Feb. 22, 1962
19 Claims. (Cl. 343—11)

This invention relates to plan position radar display apparatus for use on a mobile craft, such as for example a ship.

It is a common practice nowadays for marine craft to use true motion radar displays, that is to say displays in which response on the display screen of all distant targets and of the radar-carrying craft move across the display screen in accordance with their respective actual motions. Such a display enables a clear appreciation to be obtained of the actions of all the various ships and also, in particular, enables fixed targets, for example buoys, to be readily distinguished from moving targets. On the other hand a relative motion display, that is to say a display in which the displayed position of the radar-carrying craft remains at a fixed point on the display screen, provides a much clearer indication of any impending possibility of collision or close approach. This is because one of the simplest ways of assessing the risk of collision between two craft is to note whether there is any change in relative bearing. If the two craft keep straight courses at constant speed and if the relative bearing of one craft from the other is constant, then the craft are on collision courses. The afterglow trails of distant targets on a relative display show the direction of relative motion and these trails, if projected forwardly would indicate the future relative track of the craft assuming all continue moving at their present speed and on their present courses. By observing the closest approach of these projected lines to the centre of the display (i.e. the position of the radar-carrying craft) the closeness of possible approach of the other ships may readily be appreciated. However, with a relative display, since the actual motions of distant targets are not indicated, the display is often difficult to interpret or understand and it is almost impossible to visualise the effect of a change of course or speed on the part of either the radar-carrying craft or a distant craft on the possibility of a collision or close approach.

According to this invention plan position radar display apparatus for use in a mobile craft comprises a cathode ray tube arranged to provide a true motion plan position display, means for storing radar information, and means for superimposing the stored information and the true motion display information with the position of the radar-carrying craft in the stored information coinciding with the present position of the radar-carrying craft in the true motion display information. The stored information may be superimposed on a cathode ray tube on which there is produced in the known manner, a true motion display, for example, by putting the stored information on interscan traces between the normal true motion display traces. As will be explained later, however, it may be preferred to provide a separate display system, for example a cathode ray tube with a short persistence screen, on which a display is provided making use of true motion and stored information.

The manner of operation of such a plan position radar display apparatus may perhaps best be explained by considering in the first place a simple form of system using a single storage tube to store radar display information. It will be appreciated that a single scan of a radar aerial system provides information about the instantaneous relative positions of targets. This information is the same whether it is utilised to form a true motion or a relative motion display. In this simple form of the invention, the operator's display tube gives a true motion plan position display and may be a cathode ray tube with a long persistence screen such as is commonly used in marine radar; the true motion display may be produced in a known manner. Periodically the storage tube may be completely cleared of stored information and the picture resulting from a single rotational scan of the aerial system then stored on this storage tube; all the echoes from distant targets in the store will be clear single plots with no afterglow trails. If the stored information is read out from the store and superimposed on the true motion display information with the stored position of the radar-carrying craft coinciding with the present position in the true motion display, the operator's display would show the full true motion display with normal afterglow trails representing the true motion of distant targets but there would also be an isolated spot near the head of each trail. This spot is the relative motion information at the time the information was put into the store and would thus indicate the relative motion situation at some past instant. Thus, for each target, a line drawn from this relative motion spot through the present true motion position of the same target would indicate the relative motion of that target with respect to the radar-carrying craft.

In this simple form of display, the stored information, which may be stored on a cathode ray storage tube and read-out when required, may most conveniently be superimposed on the true motion display by applying this stored information during the interscan periods, that is to say during the intervals between the normal radar time base display scans. With such an arrangement there is no loss of true motion display information and the relative motion information is electronically superimposed on the true motion display. The relative motion information may be put on conveniently once in each aerial rotation. With this arrangement, after the relative motion information store has been cleared and fresh information fed into the store the relative motion and true motion information will coincide and gradually the relative motion display for each target will move relatively to the head of the true motion afterglow trail so that there will be an afterglow trail extending outwardly from the true motion track to the spot used for determining the relative motion. Each time the store is cleared and fresh information written into it, the stored information coincides with the true motion display and a new branching afterglow trail will thus be produced. The relative motion will be indicated as previously mentioned by a line drawn from the last displayed relative motion spot through the present true motion position of the appropriate target. Such a simple system may be satisfactory for many purposes but as will be described later it is possible to eliminate the unwanted branching afterglow trail or trails leading to the relative motion plots. This may be very desirable because the picture may show the true motion trail with several branching afterglow trails leading to former positions of the true motion spot various trails being produced in accordance with the periodic resetting of the information in the store which in the case of a marine radar would probably be done every few minutes.

However before discussing how these unwanted trails may be avoided, consideration will be given to a further matter. The display so far described produces relative motion information based on the present course of the radar-carrying craft. To determine how best to avoid any risk of collision, it may be desirable to assess the relative motion situation which would exist if a proposed alteration in course of the radar-carrying craft was made.

This may be done in the following manner: a hypothetical past position for the radar-carrying craft may be determined assuming the craft had been on the proposed new course and this hypothetical position is then used as the center for the super-positioning of the stored information that is to say the past relative position information with the stored position of the radar-carrying craft at this hypothetical position. The lines joining, for each target, the position representing that target in the stored information on the display with the head of the true motion track of the target now represent the relative motions of the various targets with respect to the radar-carrying craft assuming that the radar-carrying craft had for this previous period been on the proposed new course. It will be seen that this display in effect takes the true motion of the distant targets by combining the relative motion with the actual motion of the radar-carrying craft and subtracts the proposed new motion of the radar-carrying craft to obtain the proposed relative motion. The new situation assuming the proposed change of course can thus be completely displayed in one aerial scan. It is therefore readily possible in a relative short time to investigate a series of possible changes of course.

It will be noted that a change of course of zero would mean that the relative situation already existing would be indicated. There is therefore no necessity for switching between separate manners of operation for considering the existing situation and possible situations of the course was changed; a control for the setting into the apparatus of the proposed change of course may be provided which is spring-loaded to be set normally at zero course change so that the existing situation is displayed unless the control is held to investigate the effect of a possible change of course.

The above described simple system may, particularly because of its simplicity, be employed in some cases but certain disadvantages have been noted and these can be eliminated or avoided. For example, the branching afterglow trails of the simple system described above may be eliminated by using a short persistence tube for the operator's display and providing another storage tube in which a true motion display is developed, this stored true motion information being read-out and fed to the short persistence display tube together with the stored relative motion information. The two sets of information may be combined by interscanning. Most conveniently information from one store is painted between time base sweeps painting information from the other store. The scanning system employed for read-out from the storage tubes and for putting information on the display tube need not be related to the radar aerial scanning rate but might be much faster and it may be convenient to use a straight line raster scanning similar to that employed in television receivers. If this is done, the display tube might be a television colour tube which is scanned in a time-sharing scanning sequence in synchronism with alternate scanning of the storage tubes so that the true motion information appears in one colour and the spots for indicating the relative motion appear in another colour.

Instead of having a short persistence display tube, it would be possible to have a display tube having phosphors laid in dots, lines or other systematic patterns. For example the phosphors may be laid in dots alternately of long persistence and short persistence material in a manner analogous to the phosphor dots of different colours on a colour television tube and it would be possible therefore to put the radar information directly onto the display tube to produce a long persistence true motion display whilst putting stored information to give the spots indicating relative motion onto the display tube in interscan periods using the short persistent phosphor, which preferably would have a distinctive colour. This would require a high speed interscan so that the short persistence plots would remain apparently visible all the time.

In a preferred form of the invention, however, for determining the relative motion situation which would exist after a proposed change of course there are provided storage means for storing the true motion information and for storing the relative motion information, the two storage means each storing the afterglow trails as well as the present positions so that the storage means in effect store the necessary information for an instantaneous reconstruction of the past situation and means are provided for reading-out the information from the storage means and extracting the display data required for producing on a display tube the true motion information with afterglow trails and the required relative motion information. If information is read-out from these two storage means and superimposed with the present position of the radar-carrying craft in the true motion store information coincident with the permanent position of that craft in relative motion store information, the resultant video signals from the two stores will only coincide as the stores are scanned through the present positions of all the targets; thus by reading out from the two stores simultaneously and by applying the video signals from the two stores to a coincidence gate, output signals from the gate will only be obtained as the stores are scanned through the present positions of all the targets. If however, the centre for the read-out scanning of the true motion store is shifted back along the track of the radar-carrying craft to a position corresponding to some past time, whilst the relative motion display store is scanned as before with the two stores being scanned in angular synchronism, the coincidence gate would give signals indicating the positions of the various targets at this single past instant of time. Thus by providing the two stores with a coincidence gate into which the video signals from the two stores are fed and by providing means for shifting the read-out centre from the true motion store back along the track of the radar-carrying craft, the positions of the various targets at any required past instant of time may be determined. It will be seen that this information is equivalent to the past relative position information stored in the previously described simple arrangement of the invention. However, the information is not now limited to one time instant in the past but is information relating to any selected time for a past period limited only by the duration of storage of the true motion and relative motion trails. As in the previously described arrangement, this information may be superimposed in the appropriate position on a true motion display with the positions of the radar-carrying craft coincident in the true motion and past position information to give a visual indication of the relative motion. In this case, however, a short persistence display tube may be employed and the past information scanned by changing the relative centres of read-out so as to determine the changing past position over a period of time so that now the scanning of the past information gives a line display on the display tube representing the relative motion. The information fed to the display tube for the true motion may include the afterglow trails (or the equivalent) from stored information. Thus now each response has two trails one showing true motion and one relative motion. These may readily be identified, for example, they may be displayed in different colours if a two colour display tube is employed or means may be provided for selectively displaying only one or the other if so required. Another means of distinguishing between the two trails will be described in more detail below in a specific description of one embodiment of the invention.

With this arrangement using two stores to enable a record of the changing past positions to be obtained, the effect of a possible change in course may be investigated by superimposing past relative motion information on a true motion display with the position of the radar-carrying craft in the relative motion information on the aforementioned hypothetical position which the radar-carrying craft would have occupied at this past instant had it been on another course. The relative positions of the two sets of information will thus have to be changed in accordance with the changing past position selected as described above to give the information of past relative motion over a time period. For example, the read-out centre from the true motion store may be shifted back along the past track of the radar-carrying craft to give the past relative positions and the centres of read-out scans of both stores shifted by the same amounts in the same direction to the aforementioned hypothetical position. If a proposed change of speed also has to be taken into account, the hypothetical position on the true motion display will be chosen in accordance with the proposed new speed while the read-out centre from the true motion store is moved back in accordance with the required time of the information. By this arrangement the operator will then see a display with the true motion appearing in the normal manner with afterglow trails. Considering one single past time, a dot will appear near the head of each trail, this dot representing the relative motion with the proposed change of course and/or speed. The line joining the dot to the head of the true motion trails will indicate the relative motions of the various targets. A series of such dots may be provided to give a continuous line trail, these dots being obtained by considering the positions at their various past time instants in succession. In such display system the change of course and change of speed may be set to zero so that the display will then indicate the true motion and also the relative situation existing with the present course and speed. The controls for setting the proposed change of course and change of speed would preferably be spring-loaded to a datum position corresponding to zero change of course and zero change of speed so that the system would normally operate to provide continuous indication of the relative position under existing conditions when not being used for investigating changes of course. It will be seen that, with this arrangement, not only can proposed changes of course be investigated but also that there are no branching afterglow trails from the relative motion information as in the simple system first described above.

Since the true motion information and the relative motion information are put in stores in the above arrangement, the whole of the required display may be obtained from the stores and it is thus possible to make use of a rapidly scanned display tube for the operator using, for example, line scanning similar to a television raster, the required information being applied to this display tube from the two stores in a time-sharing sequence. Moreover, the display tube may be a colour tube such as is used in television colour systems so that the true motion and relative motion information can appear in distinctive colours. Also the phosphor material for the true motion and relative motion information may be made of different persistence so that a long persistent true motion picture may be made whilst the relative motion information can appear with a short persistence display and in a distinctive colour. With such a television type raster scanning, the read-out from the stores onto the operator's display tube may be presented at a flicker-free frame repetition rate and this will avoid any excessive time lag when investigating a change of course.

In the simplest type of display system described above in which the information is read out from a store at the same speed as is put in, it is possible to use many types of storage tube, for example a tube of the kind having a single gun which is employed alternately for writing and reading. Where however the information is to be read out at a different scanning speed or with a different scanning raster from the writing-in of the information, a storage tube of the kind employing separate writing and reading guns may be employed. Such tubes may have the two guns either on the same side of the storage screen or on the opposite side of the storage screen. Particularly however where any television type raster is to be used for the operator's display, it may be more convenient to employ for the storage tube a primary short persistence display which is scanned by a television type camera using a long persistence light-sensitive surface, the latter thus providing in effect the storage surface. For the relative motion display, the camera may be stationary whilst, for the true motion store, the camera may be mounted so that it is movable relative to the tube being scanned in accordance with the motion of the radar-carrying craft or optical means controlled in accordance with the motion of the craft may be provided for moving the image seen by the camera.

The following is a description of two embodiments of the invention, reference being made to the accompanying drawings in which:

FIGURE 1 is a diagram illustrating one embodiment;

FIGURES 2 and 3 illustrate diagrammatically the appearance of the display screen in the arrangement of FIGURE 1;

Figure 4:
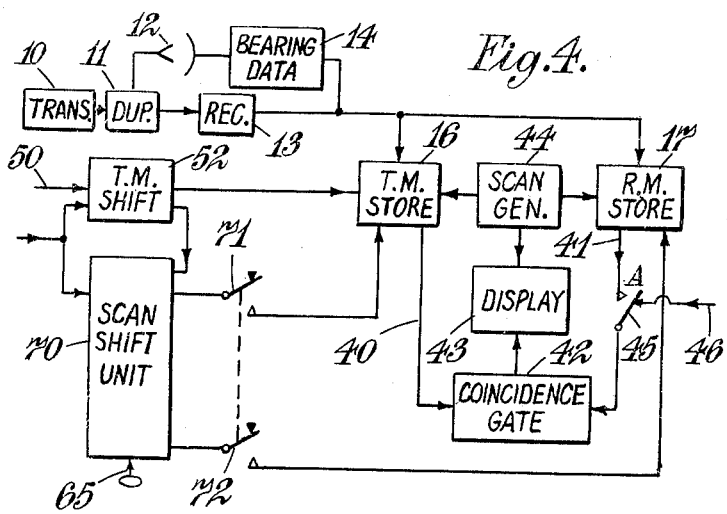
FIGURE 4 is a block diagram illustrating another embodiment of the invention.

FIGURE 1 illustrates diagrammatically a simple embodiment of the invention. Referring to that figure there is shown a pulse radar apparatus 1 on a mobile craft having a scanning aerial system 2 to feed video signals to a cathode ray tube 3 having a rotating radial trace to provide a plan position display. The display is gradually off-centred by a true motion off-centering unit 4 in accordance with the movement of the craft so as to give a true motion display on the screen of the tube 1. This tube has a long persistence phosphor screen such as is commonly employed in plan position radar apparatus. The radar information is also fed to a store 5 which typically is a storage tube, the information being periodically cleared and fresh information written into the store under the control of a timing device 6. The information from the store 5 is read out and displayed on the tube 3 during the interscan periods between normal radar display scans. The position of the radar-carrying craft in the stored information is superimposed on the present position of the craft in the true motion display and the displays are aligned in bearing. The resultant display is illustrated diagrammatically in FIGURE 2 where the present position of the radar-carrying craft is indicated by the signal at O. From the true motion display, an afterglow trail extends from O in the direction of the past track of the craft and this trail is indicated diagrammatically by a straight line passing through a point O, which represents the past position at the instant when information was fed into the store 5. Two other craft detected by the radar apparatus give responses in the true motion display at A and B. These responses also have afterglow trails showing the past tracks of these craft, these trails being shown diagrammatically by the straight lines through $A_1$ and $B_1$ which were the positions at the instant information was fed into the store 5. The stored information is displayed however with its centre at O and not $O_1$ and thus the two distant targets appear, in the displayed stored information, not at $A_1$ and $B_1$ but at $A_2$ and $B_2$, these points being displaced from $A_1$ and $B_1$ by the amount and direction of $O_1O$. The lines $A_2A$ and $B_2B$ show the relative motions of the two targets and the distances $A_2A$ and $B_2B$ as compared with $O_1O$ indicate the speed of such relative motion. In FIGURE 2, and in subsequent FIGURES 3, 9 and 10, the arrows in the figure indicate the direction of the movement indicated by the points through which the respective arrows pass. It will however be readily appreciated that the arrows do not form part of the display. Periodically the timing unit 6 clears and refills the store 5. When this is done, the positional information in the store 5 is the same as the radar information being fed to the tube 3 to produce the display. Read-out of the stored information now produces new responses ($A_2$, $B_2$) which coincide with the present positions of the targets on the time motion display. At the instant of resetting prior to the position shown in FIGURE 2, the true motion display positions and the read-out positions were therefore at A, and B. Since the stored positions have been read out during successive interscan periods in the interior between the times at which the targets are at A, B, and $A_2$, $B_2$, there will be a series of closely spaced "pips" on the display screen between the positions $A_1$ and $A_2$, and $B_1$ and $B_2$ respectively. The series of "pips" in effect form unwanted afterglow trails along the lines $A_1$, $A_2$ and $B_1$, $B_2$. In some cases such unwanted trails may be accepted because of the great simplicity of the system but, as will be explained later, it is possible to avoid these unwanted afterglow trails. Before discussing that however, it will now be explained how the arrangement of FIGURE 1 may be used to investigate the effect on the relative motion of possible changes of course.

Referring to FIGURE 3, there is shown the same true motion display of the various craft O, A, and B, with the afterglow trails represented by lines through the actual past positions $O_1$, $A_1$, and $B_1$. In FIGURE 3 however the store read-out centre has now been moved to a position indicated by the point $O_3$ which is the hypothetical past position of the radar-carrying craft assuming a new course and speed, that is to say, the craft is now assumed to have been travelling along the line $O_3O$; if the speed is changed the distance $O_3O$ is made in the appropriate ratio to the distance $O_1O$ corresponding to the ratio of the new speed to the old speed. The point $O_3$ will not be displayed on the screen, but is shown in FIGURE 3 to facilitate the understanding of the figure. This change in position of the stored information gives positions $A_3$ and $B_3$ as the displayed positions of the stored information about the distant targets. Compared with $A_2$ and $B_2$, it will be seen that the effect is a vector subtraction of the actual motion of the radar-carrying craft and a vector addition of the hypothetical motion. Thus $A_3A$ and $B_3B$ show the directions of relative motion for the proposed course and speed. The effect of a proposed change in course and speed may thus readily be investigated merely by shifting the read-out centre of the stored information to the appropriate hypothetical position. This may be done preferably when reading-out from the store 5 but might be done by shifting the centre of the scanning during the interscan periods when the stored information is displayed on the tube 3.

To avoid the previously mentioned unwanted afterglow trails, the preferred form of apparatus shown in FIGURES 4 to 8 may be employed. Referring to FIGURE 4 there is illustrated diagrammatically radar apparatus comprising a transmitter 10 which produces short duration pulses of microwave energy which are fed through a duplexer 11 to a rotatable scanning aerial system 12. Echoes from targets are picked up by the aerial 12 and are fed through the duplexer 11 to a receiver 13. The radar apparatus thus far described may be of known construction and provides video signals which carry information representing the ranges of the various targets and which, together with bearing data representative of the instantaneous angular position of the aerial 12 from a bearing data transmitter 14, is fed into two storage systems 16, 17. These two storage systems will be referred to hereinafter as the true motion store and the relative motion store. At any one instant of time, the distance from the radar-carrying craft to any other craft is independent of whether the information is to be stored in true motion or relative motion. The information fed into the two stores 16, 17 is therefore identical. The true motion and relative motion aspects only become apparent from the different ways in which the successive information is utilised.

Figure 5:
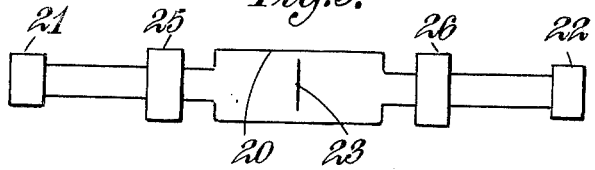
FIGURE 5 is a diagram illustrating a storage tube employed in the system of FIGURE 4.

FIGURE 5 illustrates one form of storage system which may be employed for each of the stores 16, 17. In the arrangement of FIGURE 5, there is provided a storage tube 20 of the kind having a separate write gun 21 and a read gun 22 which produce electron beams scanning the storage surface 23 from opposite sides thereof. To write information in the store the beam of the write gun 21 may very conveniently be deflected with the conventional radial scanning employed in plan position radar display systems by a deflection system indicated diagrammatically at 25, the beam being scanned radially and the radial direction of scanning being rotated in synchronism with the rotation of the aerial. In the particular embodiment being described the storage surface 23 provides a long persistance storage so that the radar data information stored on this surface would be a plan position display with afterglow trails. For the true motion store 16 the deflection system 25 will be arranged to effect scanning in accordance with a true motion display for example in the known manner for true motion radar plan position displays, that is to say the position of the centre of the scan is gradually displaced across the tube screen in accordance with the motion of the radar-carrying craft. For the relative motion store 17 the deflection system 25 will be arranged to effect the scanning to provide a relative motion plan position radar display, that is to say the centre of the scan will remain at a fixed point on the tube screen. The information may be read from the storage surface 23 by scanning the electron beam from the read gun 22 by means of a deflection system 26. Since the complete picture is stored on the storage surface 23 the read gun beam may be scanned in any convenient manner and in the embodiment now being described it is convenient to employ a scanning system similar to a television raster scanning that is to say a series of line scans which are gradually displaced across the surface of the screen. Furthermore there is no necessity to synchronise the scanning for read-out with the speed of writing information onto the storage surface and for reasons which will be apparent later it is convenient to use a much faster scanning rate for read-out than for writing.

Figure 6:
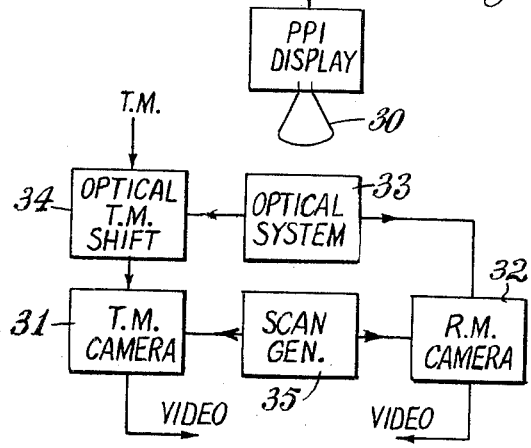
FIGURE 6 is a further diagram illustrating another form of storage system making use of a television camera.

FIGURE 6 illustrates an alternative arrangement for storing information. In the arrangement of FIGURE 6 the radar data comprising the video signals with the range and bearing information are applied to a display tube 30 having a short persistence display screen to produce a plan position display on the screen of the tube. On this display tube, the information is most conveniently displayed as a relative motion display with the radar-carrying craft's position in the centre of the display. It will be remembered that the instantaneous radar information is the same for both a true motion and a relative motion display and, since the tube 30 has a short persistence screen, this display may be utilised, as described below to give information for both true motion and relative motion display stores. Two television-type camera tubes 31, 32 are provided which are used respectively to provide the true motion and relative motion information. These camera tubes however differ from conventional television tubes in that they have long persistence screens so that the information optically presented to the camera tubes is stored. An optical system 33 presents the short persistent relative motion display from the tube 30 directly to the camera 32. However due to the long persistent screen in the camera, this display will in effect have afterglow trails and the output from this camera 32 is thus a relative motion display showing relative motions of targets over a past period of time. Movement corresponding to the true motion of the radar-carrying craft is applied optically by an optical shift system 34 to the display seen by the camera tube 31 which also sees an image from the optical system 33. This movement is such that the input information to the camera tube 31 corresponds to a true motion radar display and, by reason of the long persistent screen in the camera tube, the output from this camera 31 will correspond to a display with afterglow trails representing the true motions of the various craft. The scanning systems for the two camera tubes 31, 32 are synchronised by a common scan generator 35. This scanning need not be synchronised with the radar aerial scanning and is preferably at a very much faster repetition rate. Very conveniently a television-type scanning raster is employed using standard television scanning frequencies.

It will be seen that the storage systems of FIGURES 5 and 6 each provide true motion and relative motion signal outputs conveniently in the form of a television-scanning raster. Referring now to FIGURE 4 again the video output signals from the true motion store 16 and the relative motion store 17 are fed by leads 40, 41 to a coincidence gate 42. This coincidence gate 42 produces output signals only when inputs are obtained simultaneously from the two stores 16 and 17, that is to say, when the video signal coincide in time at the coincidence gate 42. The output signals from the coincidence gate 42 are fed to an operator's display tube 43, this display tube being scanned in synchronism with the scanning employed for the read-out from the stores 16, 17 by the read-out scan generator 44 which controls that scanning. As previously indicated, this scanning is conveniently a television scanning raster at a standard television scanning frequency and the display 43, which has a display tube with a non-persistent phosphor, might conveniently be a television monitor display. This facilitates the use of the display unit for other purposes, for example the display of a harbour radar picture relayed from a shore-based radar station by a television link.

The information read-out from each of the stores 16 and 17 will be in effect video signals corresponding to the present position and afterglow trails of the true motion and relative motion displays. Considering in the first case that the position of the radar-carrying craft in the true motion and relative motion information is made to coincide, then, because the aftergow trails will be in different directions, coincidence between the video signals will only occur at the present positions of each of the distant targets. In this case therefore the output signals from the coincidence gate 42 would represent only the present positions of the distant targets. If however the read-out centre for the true motion store scanning was shifted back along the track of the radar-carrying craft to a position corresponding to the position of that craft at some past time whilst the relative motion display was scanned as before, then the coincidence gate 42 would only give signals when the afterglow trails from the true motion and relative motion stores provide simultaneous signals which as previously explained, would then represent the instantaneous position at this past time. The condition can be visualized by considering a true motion display and a relative motion display superimposed. If the position of the radar-carrying craft is the same in both displays, then the afterglow trails from each display will be trails leading to the present position of each target and the positions on the two displays of the targets will coincide. If however the true motion read-out centre (the point to be superimposed on the relative motion read-out centre) is shifted back along the trail of the radar-carrying craft, the true motion display is shifted with respect to the relative motion display in the direction of the track of the radar-carrying craft, then the two displays will no longer coincide at the present positions of the targets but the afterglow trails will cross one another. It will readily be seen that the point which they cross corresponds to the position of the targets at this past instant, this position being relative to the read-out centre, that is to say the past position of the radar-carrying craft shown by the amount of which the display has been shifted back. Thus by applying a shift to the scanning of the true motion store it is possible with this arrangement to read-out information showing the past positions of the various targets.

The apparatus display 43 is desired in this particular embodiment to be basically a true motion display and we can now consider how this display is formed. In order to make the simple true motion display for the operator, the information on lead 40 from the true motion store 16 is fed into one input of the coincidence gate 42 and a continuous gate-opening potential is applied to the other input of this gate so that the true motion video information is fed out continuously to the operator's display 43. For this purpose a switch 45 is provided in the lead 41 and this switch is moved to the position marked A at which the continous gate-opening potential from a lead 46 is applied through the switch to the coincidence gate 42.

Figure 7:
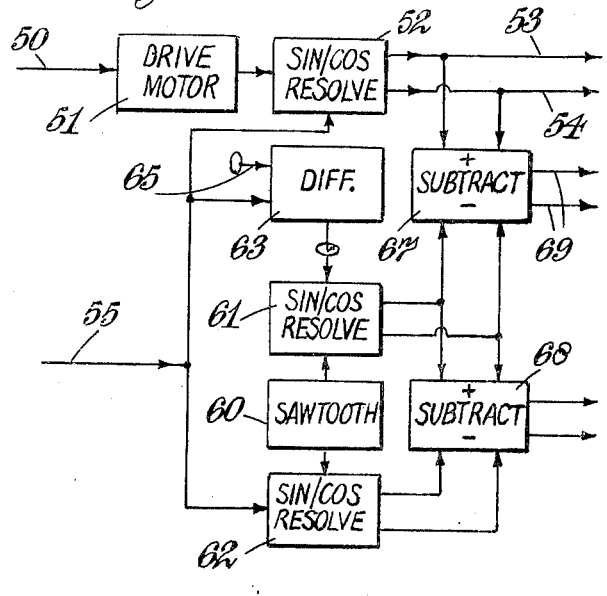
FIGURE 7 is a diagram illustrating a shift control.

Onto this true motion display it is desired to superimpose during interscan periods relative motion information. This relative motion information may be information in respect of relative motion using the present track and speed of the radar-carrying craft or it may be a display showing the relative motion which would occur if this craft changed its course or speed. This information is to be displayed on the apparatus display as trails representing the relative motion and it is obtained by applying appropriate displacements to the read-out centres for the true motion and relative motion stores 16 and 17. The apparatus for providing these shifts is illustrated in FIGURE 7. Input signals from the ship's log (or from an artificial log simulating such signals in accordance with the setting of a manually adjusted "speed" control) on a lead 50 typically pulses corresponding to units of distance travelled, are applied to a drive motor 51 to provide a rotational drive to a shaft representing the distance travelled by the radar-carrying craft and shaft-rotation is mechanically resolved by a mechanical sine-cosine resolver 52 into sine and cosine co-ordinate components. The mechanical movements representing these two components are used to drive electrical potentiometers to give electrical outputs on lead 53 and 54 representative of the two co-ordinate components of the movement of the radar-carrying craft in two orthogonal co-ordinate directions. The sine-cosine resolver 52 has to be set in accordance with the heading of the radar-carrying craft and this information is obtained from a compass input indicated at 55. The signals on the leads 53, 54 may, however, be obtained from the compass and the ship's log information in any known manner. The signals on leads 53, 54 are used directly for controlling the writing into the true motion store, e.g. the shift signals are applied to the writing deflection system of a storage tube such as is shown in FIGURE 5 or the movement of the optical shift system 34 in the storage system of FIGURE 6. They are also used for shifting the read-out from the true motion store 16 so that the radar-carrying craft is centred in the read-out information. There is no shift applied to the read-out from the relative motion store 17 and thus, on the operator's display 43, the radar-carrying craft remains in the centre of the screen whilst the "afterglow" representing the past track of the craft streams away from it. It will be appreciated that since there is no afterglow on the display tube 43 itself, it does not matter whether the position representing the radar-carrying craft on the tube screen moves across the screen or remains at the centre. If it remains at the centre, as in the arrangement described, the necessity for periodic re-setting (automatically or manually) is avoided.

To enable the past information to be read-out from the stores there is provided a sawtooth generator 60 generating a low frequency sawtooth wave. It is this waveform which is to provide the movement back along the past track of the radar-carrying craft and the repetition frequency is preferably made just sufficient that the past information is scanned at a rate to avoid flicker in the display. It is preferred to employ a sawtooth waveform generator generating a waveform having a steep leading edge with a slow fall to the datum level. As will be apparent from the following description this provides a relative motion spot on the operator's display having a darting movement in the direction of the retalive motion so serving to show this direction and distinguishing the relative motion from the true motion tracks. The output from from this sawtooth generator 60 is fed to two sine-cosine resolvers 61, 62 which typically would be sine-cosine potentiometers. The resolver 62 is set in accordance with the compass input information from 55 so as to resolve the sawtooth waveform into sine and cosine components along the heading of the radar-carrying craft. The sine-cosine resolver 61 is set in accordance with the proposed course-to-steer which it is required to investigate. It would be possible to have a manual input control which could be set by a calibrated manual control directly in accordance with the proposed course-to-steer but it is preferred to drive the input shaft on the sine-cosine resolver 61 from a differential gear 63 having a first input 64 from the compass input 55 and a second input 65 which is a manual course change input control. The output shaft 66 of the differential gear 63 will thus represent the sum of the compass course and the change of course set in manually and hence would represent the course-to-steer. The manual input control 65 now set in accordance with the proposed change in course and not the proposed course and is provided with a spring loading device so that it returns to a datum position corresponding to zero course change being put in. Thus, unless this manual control is held in some particular position, the course-to-steer fed into the sine-cosine resolver 61 will be the actual compass course from the input 55 and will be the same as the input into the sine-cosine resolver 62. Assuming in the first place that the manual control 65 is left in the datum position, then the sine-cosine resolver 61 will feed out sine-cosine signals representative of the components of motion of the radar-carrying craft and these are fed into the two subtractors 67 and 68. In the subtractors 67 this information is subtracted from the true motion information from leads 53, 54 to provide signals on output leads 69 which are used for controlling the centering of the read-out scanning from the true motion store 16. In this condition the normal true motion voltages on leads 53, 54 would control the centering of the writing of information into the true motion store whilst the stored information would be read out using a centre dependent on the difference between the true motion and the sine-cosine voltages from the resolver 61. These are voltages representing the track of the radar-carrying craft and hence the read-out information is from a centre which is moved back along the past track of the radar-carrying craft by a distance dependent on the instantaneous value of the voltages from the resolver 61. The input signal to the resolver 61 is the sawtooth waveform from the sawtooth generator 60 and hence the read-out centre is gradually moved along the track of the radar-carrying craft, repetitively being swept back by the sawtooth waveform from the sawtooth generator 60. The subtractor 68 subtracts, from the output of the resolver 61, the output of a similar sine-cosine resolver 62 which is fed with the same sawtooth signal for the generator 60 but which is set in accordance with the compass heading. The function and operation of the subtractor 68 will be apparent from the later description.

As has previously been explained this gradual displacement of the relative positions of the true motion and relative motion information when the information is combined in the coincidence gate 42 gives the past position of the various targets. Considering again FIGURE 4 the ship's log information on lead 50 is fed into the mechanical sine-cosine resolver 52 to provide the necessary shift signals for writing in the true motion store. The units of FIGURE 7 which provide the shift signals for read-out are indicated in FIGURE 4 diagrammatically by a single block 70. This unit 70 provides the shift signals for the true motion and relative motion read-out. The shift signals for the true motion store are applied to that store through a switch 71 which is ganged with the aforementioned switch 45 so that, during the normal radar display, the switch 71 is open and the read-out centre shift has no effect. During the interscan periods when the past information is to be displayed, the switch 71 is closed so that the effective centre of read-out from the true motion store 16 is dislpaced in the manner described above. The unit 70 simultaneously effects, via a switch 72 which is ganged with switches 45 and 72, the necessary displacement of the read-out centre from the store 17. The arrangement thus far described will now provide, superimposed on the true motion picture on the operator's display 43, trails extending from the present positions of the various targets and representing the relative motion of the various craft. These trails, assuming no change of course has been inserted by adjustment of the control 65, represent the relative motion of the various craft with respect to the radar-carrying craft, assuming they all remain on their present courses and speeds. The use of a reverse sawtooth wave, i.e. having a steep leading edge with a slow fall to zero, if it is at a suitable repetition rate, gives the relative motion trail as a spot with a darting movement in the direction of relative motion. Thus not only is the direction shown but this trail is distinguished from the true motion trail. However other means may be provided for distinguishing the two trails, for example a two colour tube could be employed with the true motion and relative motion information displayed in different colours or the relative motion trail may be interrupted to appear as a dotted line.

Figure 9:
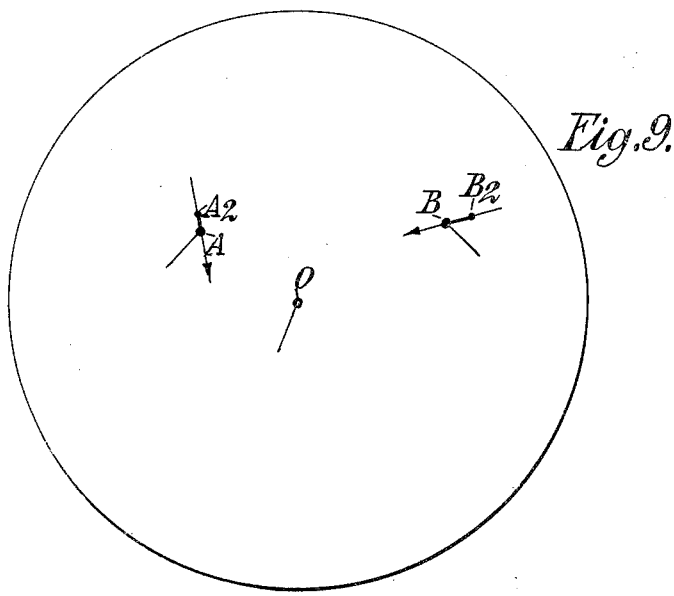
FIGURES 9 and 10 illustrate diagrammatically the appearance of the display screen in the arrangement of FIGURE 4.

This display is illustrated in FIGURE 9 which shows the present position of the radar-carrying craft at O with the afterglow trail represented in the drawing diagrammatically by a line extending to the point O. Two distant targets are shown at A and B and these now have two trails, one of finite length and constant intensity due to the repetitive scanning back along the track of the radar-carrying craft showing the relative motion and the other continuing indefinitely (but with the past information gradually fading) showing the true motion.

Considering now the effect of putting in a manual course change on the control 65 for the differential gear 63. In the first place the course-to-steer input 66 to the sine-cosine resolver 61 will now represent the proposed new course and not the actual track of the radar-carrying craft. The signals fed into the subtractor 67 will therefore correspond to this proposed new course and the centre of the true motion read-out will now be moved back not along the past track of the radar-carrying craft but along a track which it would have taken if it had been steering the proposed new course. These signals from the sine-cosine resolver 61 representing the components of the movement along the proposed new course are fed also into the aforementioned subtractor 68 where they are subtracted from the components from the resolver 62 representing the actual track of the radar-carrying craft. The subtractor 68 provides the necessary shift signals for shifting the read-out centre for the relative motion store, so providing the necessary shift so that the past position of the radar-carrying craft read-out from the relative motion store will coincide with the past position of the radar-carrying craft on the true motion store and hence then the intersection of the afterglow trails which produce the video signals at the video coincidence gate 42 will now represent the past position of the various targets assuming that the radar-carrying craft had been on this changed course. The sawtooth scanning causes this past position signal to represent cyclically the changing position of the craft assuming these conditions and hence the afterglow trail produced by the video signals will represent the relative motions on the assumption that the radar-carrying craft had changed its course by the amount set into the change of course control 65.

Figure 10:
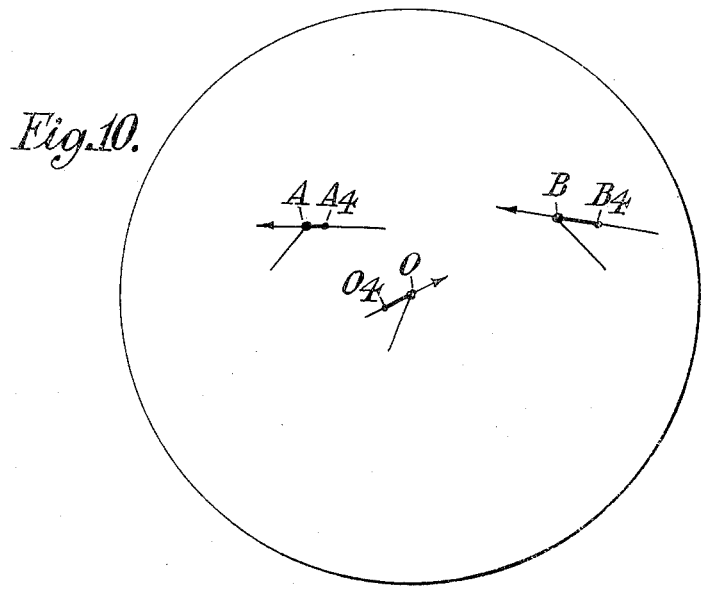

This condition is illustrated in FIGURE 10 which shows the craft in the same position as in FIGURES 2, 3 and 9. From O, there is a repetitive scan giving a line $OO_4$ back along the hypothetical track with corresponding relative motion lines extending from A and B to the points $A_4$ and $B_4$, these lines also being of constant intensity. The true motion afterglow trails extend as before from O, A and B. The point $O_4$ marks the end of the line scan showing the hypothetical track of the radar carrying craft. When a repetitive scan giving lines of constant intensity is used, the point $O_4$ will not appear to stand out from the line $OO_4$; however, if for example a two color television display tube as described elsewhere is used for the display, the point $O_4$ will be represented by the last dot in the line of dots extending from O to $O_4$.

It will thus be seen that the operator's display 43 now provides a true motion picture with, in the normal conditions, a relative motion display in the form of trails superimposed during the interscan periods. These trails may be flicker-free provided the sawtooth scan generator 60 has a sufficiently high repetition frequency but they may be made sufficiently slowly repeated that the aforementioned darting movements is obtained giving these relative motion trails a distinctive appearance so that they are clearly distinguished from the true motion afterglow trails. As previously explained however the true motion and relative motion trails may be distinguished in other ways, e.g. by using a two colour display tube and making the trails appear in different colours or by interrupting the relative motion trails so that it appears as a dotted line.

Figure 8:
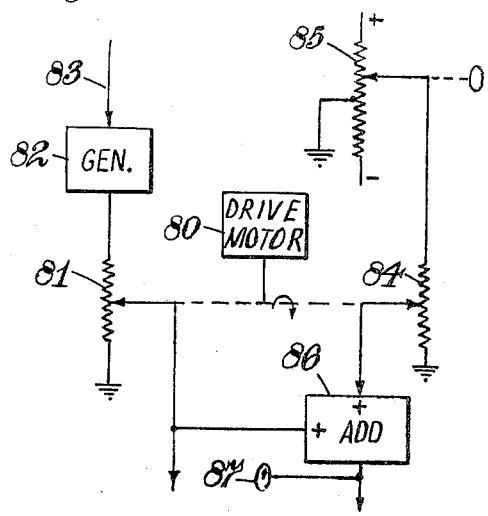
FIGURE 8 is a diagram illustrating a part of the shift control.

The apparatus thus far described provides for indicating to an observer the effects of a proposed change of course. In some cases, a possible change of speed might also have to be considered. To investigate the effect of the change of speed, there may be provided the further apparatus illustrated in FIGURE 8. In FIGURE 8, instead of providing a simple sawtooth generator generating a sawtooth waveform of regular repetition rate and of constant amplitude there is provided a sawtooth generator comprising a drive motor 80 which drives a potentiometer 81 continuously in one direction this potentiometer having a circular track so that it thereby produces a repetitive sawtooth waveform. The voltage supplied to this potentiometer is derived from a device 82 generating a voltage on a lead 83 proportional to the speed of the radar-carrying craft from ship's log (or from an artificial log manually set to produce a voltage proportional to the speed). The output from the potentiometer 81 is thus a sawtooth with a peak amplitude proportional to the speed of the radar-carrying craft. The output from this sawtooth generator formed by the potentiometer 81 is fed directly to the sine-cosine resolver 62 of FIGURE 7, that is to say the relative motion read-out resolver. As a result of this all relative motion trails will be of a length proportional to the relative speed of the radar-carrying craft with respect to the target speed. This is a useful property even in a system not providing for any investigation for effects of change of speeds. The motor 80 also drives a second potentiometer 84, which is similar to the potentiometer 81 and to which is applied a voltage, conveniently from a manually controlled potentiometer 85, representative of the required change of speed. The voltage applied to the potentiometer 85 is obtained from a fixed reference voltage source calibrated to agree with the voltage output of the speed voltage generator 82. The potentiometer 85 may be provided with a manual control knob spring-biased to return to the zero voltage position that is to say the centre position, so that, if the control knob is released, zero voltage corresponding to zero change of speed will be applied to the potentiometer 84. The output from the potentiometer 84 is added in an adding circuit 86 to the output from the potentiometer 81 to give a sawtooth voltage having a peak amplitude representative of the proposed new speed. This voltage may be indicated by a meter 87 which can be calibrated to read directly the proposed new speed. The sawtooth output from the adder 86 is fed into the sine-cosine resolver 61 of FIGURE 7 in place of the output from the sawtooth generator 60. It may be seen that as a result of this arrangement, the display is modified to take into account not only the proposed change of course but also any proposed change of speed as set in on the control potentiometer 85.

In the above description resolvers employing direct currents have been described. Other types of resolvers might be used, for example, alternating current resolvers fed from suitable alternating signal source. It will be appreciated that the description of the various circuits has been simplied in order to make clear the nature of the invention. For example, when one potentiometer has to be fed from another, care has to be taken to eliminate the effects of loading, for example by controlling the law of resistance variation or by calibration of the dials or by electronic isolation.

Since the display 43 provided for the operator is now scanned with any convenient type of scanning used for read-out from the true motion store 16 and the voltage motion store 17, it is convenient to use a linear raster type of scanning similar to a television line scan and in this case it becomes readily possible to use a colour television tube for the display 43. The true motion display and the interscan information representing the relative motion can thus be made to appear in distinctive colours by time sharing of the scanning. The display 43 may conveniently operate at conventional television scanning standards and may, for example, be generally similar to a television monitor unit. It may thus readily be used for displaying other information, for example information from a shore-based radar transmitted over a television link.

As previously explained, the display on the tube 43 in the arrangement described has the radar-carrying craft centred on the display. Since the read-out from the true-motion store is shifted, if that store merely covered the same area as the required operator's display, the true motion information on the operator's display would be incomplete but the relative motion information would fill the operator's display. This may be acceptable as full view ahead with collision warning from the relative motion component where necessary would be available but this difficulty can be overcome by making the true motion store cover a larger area, conveniently an area of twice the diameter, than the area required to be displayed on the operator's display 43. It would alternatively be possible to keep the read-out from the true motion store fixed, to give the read-out from the relative motion store a reverse true motion shift and to apply the reverse true motion shift to the operator's display but this would require stores covering larger areas than the display from both true motion and relative motion if blank areas are to be avoided on the operator's display.

In some cases it may be preferred to make the radar-carrying craft follow its own true motion on the operator's display 43 and in this case the true motion read-out may be fixed and the relative motion read-out give a reverse true motion shift. No shift is applied to the operator's display. The relative motion information would be incomplete unless the relative motion store covers a larger area, at least twice the diameter, than the required display. A similar display could alternatively be obtained by giving the true motion read-out a true motion shift whilst keeping the relative motion read-out fixed and putting a true motion shift on the operator's display but this would require both the true motion and relative motion stores to cover a larger area than the required display if blank areas are to be avoided.

It will be appreciated that many variations are possible. It may be advantageous to make both the relative motion and true motion stores cover areas of one and one-half times the diameter required for the operator's display. Half scale true motion shift may then be employed for reading-out from the true motion store and half scale reverse true motion shift for reading-out from the relative motion store. The operator's display might then have no shift; this permits more efficient use of the stores and gives better resolution than a double size store arrangement. Alternatively the operator's display might be given half scale reverse true motion shift so that the radar-carrying craft remains at the centre of the display in which case the display raster would need to overlap the edges of the screen, being one and one-half times the screen diameter; this latter arrangement is particularly advantageous in maintaining a complete view all round.

In all the arrangements descibed resetting of the true motion would be necessry whenever the edge of the store is reached or approached too closely and this may be done automatically.

In the various alternative storage and display arrangements just described, it will be understood tht the backtrcking shifts may be superimposed, during interscan periods as in the arrangement illustrated in the drawings.

I claim:

1. Plan position radar display apparatus for use in a mobile craft comprising a cathode ray tube arranged to display on a display screen true motion plan position information with the position of the mobile craft being displaced across the display screen in accordance with the movement of the radar-carrying craft, means for storing plan position radar information representing the positions of targets with respect to the position of the radar-carrying craft, and means for superimposing the stored information and the true motion information with the position of the mobile craft in the stored information coinciding on the display screen with the position of the mobile craft in the true motion information.

2. Plan position radar display apparatus as claimed in claim 1 wherein the true motion information is displayed with a two-dimensional repetitive scan on said cathode ray tube which tube has a long persistence screen to provide an afterglow trail and wherein the stored information is superimposed on the display by putting the stored information on interscan traces between the normal true motion display traces.

3. Plan position radar display apparatus as claimed in claim 2 wherein said means for storing radar information comprises a storage tube and means for periodically clearing and feeding fresh radar information into the storage tube and wherein the stored information is displayed on interscan traces on said cathode ray tube screen.

4. Plan position radar display apparatus for use on a mobile craft comprising a cathode ray tube arranged to provide a true motion plan position display, means for storing radar information, means for superimposing stored information from said storing means and the true motion display information on said cathode ray tube with the position of the radar-carrying craft in the stored information coinciding with the present position of the radar-carrying craft in the true motion display information, and means for off-setting the superimposition of the stored information on the true motion display so that it can be centred on a point on the true motion display corresponding to a hypothetical past position of the radar-carrying craft assuming that craft had been on a different course or travelling at a different speed whereby the effect on the relative motion of distant targets of a change of course or speed may be investigated.

5. Plan position radar display apparatus as claimed in claim 4 wherein said means for off-setting the superimposition of the stored information on the true motion display include manual control means for setting in the effects of a change of course and/or speed, which control means are spring-biased to a zero-change datum position.

6. Plan position radar display apparatus for use in a mobile craft comprising a cathode ray tube with a display screen, storage means for storing true motion information and for storing relative motion information, the two storage means each storing the afterglow trails as well as the present positions, means for reading-out by repetitive scanning from the two storage means simultaneously to provide video signals, scanning centre control means controlling the scanning read-out centres for the read-out from the storage means so that the position of the radar-carrying craft on the two sets of stored information is scanned simultaneously, a coincidence gate to which the read-out video signals are applied and means operative on said scanning centre control means for shifting the centre for the read-out scanning of the true motion storage means from coincidence with the position of the radar-carrying craft in the relative motion storage means back along the track of the radar-carrying craft whilst the relative motion storage means is scanned with an unchanged centre of scanning, the two storage means being scanned in synchronism.

7. Plan position radar display apparatus as claimed in claim 6 wherein said cathode ray tube has a short persistence screen and wherein the stored true motion information is displayed on said cathode ray tube to provide the true motion display.

8. Plan position radar display apparatus as claimed in claim 6 and wherein scanning means are provided operative on said scanning centre control means for repetitively changing the relative centres of read-out from said storage means to re-construct the past information over a period of time whereby each response on the cathode ray tube has two trails, one shownig true motion and one relative motion and wherein means are provided for identifying the two trails.

9. Plan position radar display apparatus as claimed in claim 8 wherein the means for identifying the trails comprise scanning means for repetitively changing the relative centres of scan using a reversed sawtooth wave so that the relative motion trail is given a darting appearance.

10. Plan position radar display apparatus as claimed in claim 6 wherein said cathode ray tube is a short persistence tube and wherein the information displayed thereon is read out from the storage means using a scanning raster independent of the aerial scanning rate.

11. Plan position radar display apparatus as claimed in claim 10 wherein said cathode ray tube is scanned with a television type raster scanning at a flicker-free frame repetition frequency.

12. Plan position radar display apparatus as claimed in claim 6 wherein means are provided for off-setting the superimposition of the stored information on the true motion display by moving the centres of read-out scans of both storage means to a hypothetical past position of the radar-carrying craft assuming that craft had been on a different course or travelling at a different speed whereby the effect on the relative motion of distant targets of a change of course or speed may be investigated.

13. Plan position radar display apparatus for use on a mobile craft comprising a cathode ray tube having a short persistence screen and arranged to provide a true motion plan position display, a first storage tube, means for periodically clearing and feeding fresh relative motion radar information into said first storage tube, a second storage tube in which true motion radar information is stored, and means for reading out the stored relative motion radar information and the true motion radar information from the two storage tubes and feeding the two sets of information to the display tube with the position of the radar carrying craft in the relative motion radar information coinciding with the position of the radar-carrying craft in the true motion radar information.

14. Plan position radar display apparatus for use on a mobile craft comprising a cathode ray tube having a short persistence screen and arranged to provide a true motion plan position display, a first storage tube, means for periodically clearing and feeding fresh relative motion radar information into said first storage tube, a second storage tube in which true motion radar information is stored, and means for reading out the stored relative motion radar information and the true motion radar information from the two storage tubes and feeding the two sets of information to the display tube with the positions of the radar carrying craft in relative motion radar information coinciding with the position of the radar-carrying craft in the true motion radar information, the information from one storage tube being displayed between time base sweeps displaying information from the other storage tube.

15. Plan position radar display apparatus for use on a mobile craft comprising a cathode ray tube having a short persistence screen and arranged to provide a true motion plan position display, a first storage tube, means for periodically clearing and feeding fresh relative motion radar information into said first storage tube, a second storage tube in which true motion radar information is stored, and means for reading out the stored relative motion radar information and the true motion radar information from the two storage tubes and feeding the two sets of information to the display tube with the position of the radar carrying craft in the relative motion radar information coinciding with the position of the radar-carrying craft in the true motion radar information, the information from the two storage tubes being read out by a straight line scanning raster independent of the radar aerial scanning gate.

16. Plan position radar display apparatus for use in a mobile craft comprising means for producing relative motion radar display information, the relative motion radar display information including indications of the past relative motions of targets with respect to the radar-carrying craft, means for producing true motion radar display information, the true motion radar display information including indications of the actual past motions of targets and the radar-carrying craft, means for feeding the two sets of information to a coincidence gate, means for shifting, with respect to a datum, the centers of the two sets of information in accordance with a hypothetical past motion of the radar carrying craft, and means for displaying the combined information from the coincidence gate, the intersections of the indications of the past motions of the targets defining hypothetical past relative motions of targets with respect to the radar-carrying craft.

17. In plan position radar display apparatus for use in a mobile craft, a first storage tube arranged to store relative motion radar display information including indications of the past motions of targets with respect to the radar-carrying craft, a second storage tube arranged to store true motion radar display information including indications of the actual past motions of targets and the radar-carrying craft, means for reading out by repetitive scanning the two sets of information from the two storage tubes to provide video signals, scanning center control means controlling the scanning read-out centers for the read out scans so that the position of the radar-carrying craft in the two sets of stored information are scanned simultaneously, means operative on said scanning center control means to shift the centers of read-out scans of both stores to a hypothetical past position of the radar carrying craft, a coincidence gate to which the read-out video signals are applied and means for displaying the combined video signals from the coincidence gate, the intersections of the indications of the past motions of targets defining hypothetical past relative motions of the targets with respect to the radar-carrying craft.

18. In plan position radar display apparatus for use in a mobile craft, a first store arranged to store relative motion radar display information including indications of the past motions of targets with respect to the radar carrying craft, a second store arranged to store true motion radar display information including indications of the actual past motions of targets and the radar-carrying craft, means for reading out by repetitive scanning the two sets of information from the two stores to provide video signals, scanning center control means controlling the scanning read out centers for the read out scans for the two stores so that the positions of the radar-carrying craft in the two sets of stored information are scanned simultaneously, means operative on said scanning center control means to repetitively shift the centers of the read-out scans, using a reversed sawtooth wave, over a hypothetical past track of the radar carrying craft, a coincidence gate to which the read-out video signals are applied and means for displaying the combined information from the coincidence gate, successive intersections of the indications of the past motions of targets defining hypothetical past relative motions of the targets with respect to the radar-carrying craft.

19. In plan position radar display apparatus for use in a mobile craft, means for producing relative motion radar display information, the relative motion radar display information including indications of the past motions of targets with respect to the radar-carrying craft, means for producing true motion radar display information, the true motion radar display information including indications of the actual past motions of targets and the radar-carrying craft, means for feeding the two sets of information to a coincidence gate, control means for shifting, with respect to a datum, the centers of the two sets of information in accordance with a hypothetical past cause and a hypothetical past speed of the radar carrying craft, said control means including a manual control for setting in the effects of hypothetical changes in motion, and biased to tend to return to a position corresponding to said datum, and means for displaying the combined information from the coincidence gate, the intersections of the indications of the past motions of the targets defining hypothetical past relative motions of the targets with respect to the radar-carrying craft.

References Cited by the Examiner
UNITED STATES PATENTS

| | | | |
|---|---|---|---|
| 3,090,043 | 5/63 | Wilkenson | 343—5 |
| 3,114,908 | 12/63 | Hall | 343—10 |
| 3,128,460 | 4/64 | Moller et al. | 343—5 |

FOREIGN PATENTS 603,691   4/60   Italy.

LEWIS H. MYERS, *Primary Examiner.*

CHESTER L. JUSTUS, *Examiner.*